US006972979B2

(12) United States Patent
Iida et al.

(10) Patent No.: US 6,972,979 B2
(45) Date of Patent: Dec. 6, 2005

(54) NONVOLATILE MEMORY

(75) Inventors: Tetsuya Iida, Kokubunji (JP); Motoki Kanamori, Tachikawa (JP); Atsushi Shikata, Higashimurayama (JP); Takayuki Tamura, Higashiyamato (JP); Kunihiro Katayama, Chigasaki (JP)

(73) Assignee: Renesas Technology Corp., Tokyo (JP)

( * ) Notice: Subject to any disclaimer, the term of this patent is extended or adjusted under 35 U.S.C. 154(b) by 86 days.

(21) Appl. No.: 10/716,504

(22) Filed: Nov. 20, 2003

(65) Prior Publication Data

US 2004/0156242 A1 Aug. 12, 2004

(30) Foreign Application Priority Data

Feb. 7, 2003 (JP) ....................................... 2003-030309

(51) Int. Cl.[7] .................................................. G11C 5/02
(52) U.S. Cl. .................. 365/51; 365/189.07; 365/233.5
(58) Field of Search ....................... 365/51, 52, 189.07, 365/189.11, 233.5

(56) References Cited

U.S. PATENT DOCUMENTS 5,517,447 A * 5/1996 Bolan et al. ................ 365/149
5,825,882 A * 10/1998 Kowalski et al. ........... 713/172
5,963,473 A * 10/1999 Norman ................. 365/185.02
6,353,553 B1 * 3/2002 Tamada et al. ........ 365/185.03
6,669,487 B1 * 12/2003 Nishizawa et al. ........... 439/60
2001/0009505 A1 7/2001 Nishizawa et al. ......... 361/737
2003/0112611 A1 6/2003 Nishizawa et al. ......... 361/763

FOREIGN PATENT DOCUMENTS

JP 2001-209773 8/2001
WO WO 01/84490 11/2001

* cited by examiner

*Primary Examiner*—Gene N. Auduong
(74) *Attorney, Agent, or Firm*—Miles & Stockbridge P.C.

(57) ABSTRACT

There is provided a technology to realize high speed data transfer while compatibility of a card type storage device comprising a nonvolatile memory is ensured. Namely, in the card type storage device comprising the nonvolatile memory, a plurality of data terminals are provided and an interface unit is provided with a circuit for determining levels of data terminals. Some or all of the plurality of data terminals are connected with pull-up resistors for pulling up to a power source voltage. When the determination circuit determines that the data terminals connected with the pull-up resistors are in an open condition, the determination circuit switches a bus width (number of bits) of data.

10 Claims, 6 Drawing Sheets

NONVOLATILE MEMORY

BACKGROUND OF THE INVENTION

The present invention relates to a technology which may be effectively applied to a nonvolatile storage device and more particularly to a technology which may be applied effectively to a card type storage device comprising a nonvolatile semiconductor memory, for example, a flash memory.

In recent years, a card type storage device which is called a memory card comprising a nonvolatile memory such as a flash memory, which can store storage data even when supply of power source voltage is stopped, has been used widely as a data memory medium of a mobile electronic device such as a digital camera.

In regard to the conventional memory card, data has generally been inputted and outputted serially between a card which is represented by a multimedia card (MultiMediaCard (registered trade mark) and a card reader. The reasons considered are that it is difficult, from the viewpoint of manufacture, to provide a sufficient number of external terminals because a memory card is small in size (as small as stamp) and it becomes difficult to realize electrical connection between a card and a card reader because interval of terminals becomes narrow when many terminals are provided.

SUMMARY OF THE INVENTION

However, with development of manufacturing technology in recent years, the number of terminals to be provided to a memory card has been increasing. The inventors of the present invention have discussed the way of realizing high speed data transfer by increasing the number of data terminals to be provided to a memory card in view of inputting and outputting in parallel the data.

As a result, it has become apparent that the number of terminals may be increased but here rises a problem that data read/write is impossible when a card is inserted to the existing card reader even if a memory card having a large number of terminals is used without considering compatibility.

An object of the present invention is to provide a technology to realize high speed data transfer while compatibility in a card type storage device comprising a nonvolatile memory is ensured.

The aforementioned and other objects and novel features of the present invention will become apparent from the description of the present specification and the accompanying drawings.

Typical inventions disclosed in this specification will be described as follows.

Namely, a card type storage device comprising a nonvolatile memory has a structure that a plurality of data terminals (for example, eight terminals) are provided and a circuit for determining a signal level at the data terminal is also provided to an interface unit, a pull-up resistor is also provided for pulling up all or some (for example, four terminals) of a plurality of data terminals to the power source voltage, and when the determination circuit determines that the data terminals connected with the pull-up resistor is in the open condition, the data transfer rate or bus width (number of parallel bits) of data transfer is switched.

According to the means described above, since a conventional card reader cannot input a signal to the data terminals additionally provided to a card type storage device comprising a plurality of data terminals, the data terminal to which the signal is not inputted because a pull-up resistor is connected remain pulled up to the power source voltage. Therefore, the determination circuit can determine the open condition by detecting the level of data terminals. Accordingly, compatibility with the conventional storage device can be ensured by determining the data transfer rate or data transfer width based on the result of determination.

Moreover, when a card reader may be used for a storage device comprising a plurality of data terminals, an amount of data to be transferred within the unit time may be increased in order to attain high speed data transfer by increasing data transfer rate or expanding bus width in data transfer. Here, it is desirable that the level of data terminal is determined with the determination circuit in such a timing that a command is inputted from an external circuit. Thereby, an increase of power consumption may be avoided by shortening the period during which the level of data terminal connected with a pull-up resistor is varied.

Here, it is more desirable that any one terminal among the external data terminals is used as the terminal in common to which a control signal is inputted. Accordingly, the number of external terminals provided to a card type storage device can be reduced to enable input and output of data of the desired number of bits. It is still more desirable that the pull-up resistor is formed on a semiconductor chip where a controller is formed. Thereby, the number of components to be mounted can be reduced and mounting density of the card type storage device can also be raised.

DETAILED DESCRIPTION OF THE PREFERRED EMBODIMENTS

The preferred embodiments of the present invention will be described with reference to the accompanying drawings.

Figure 1:
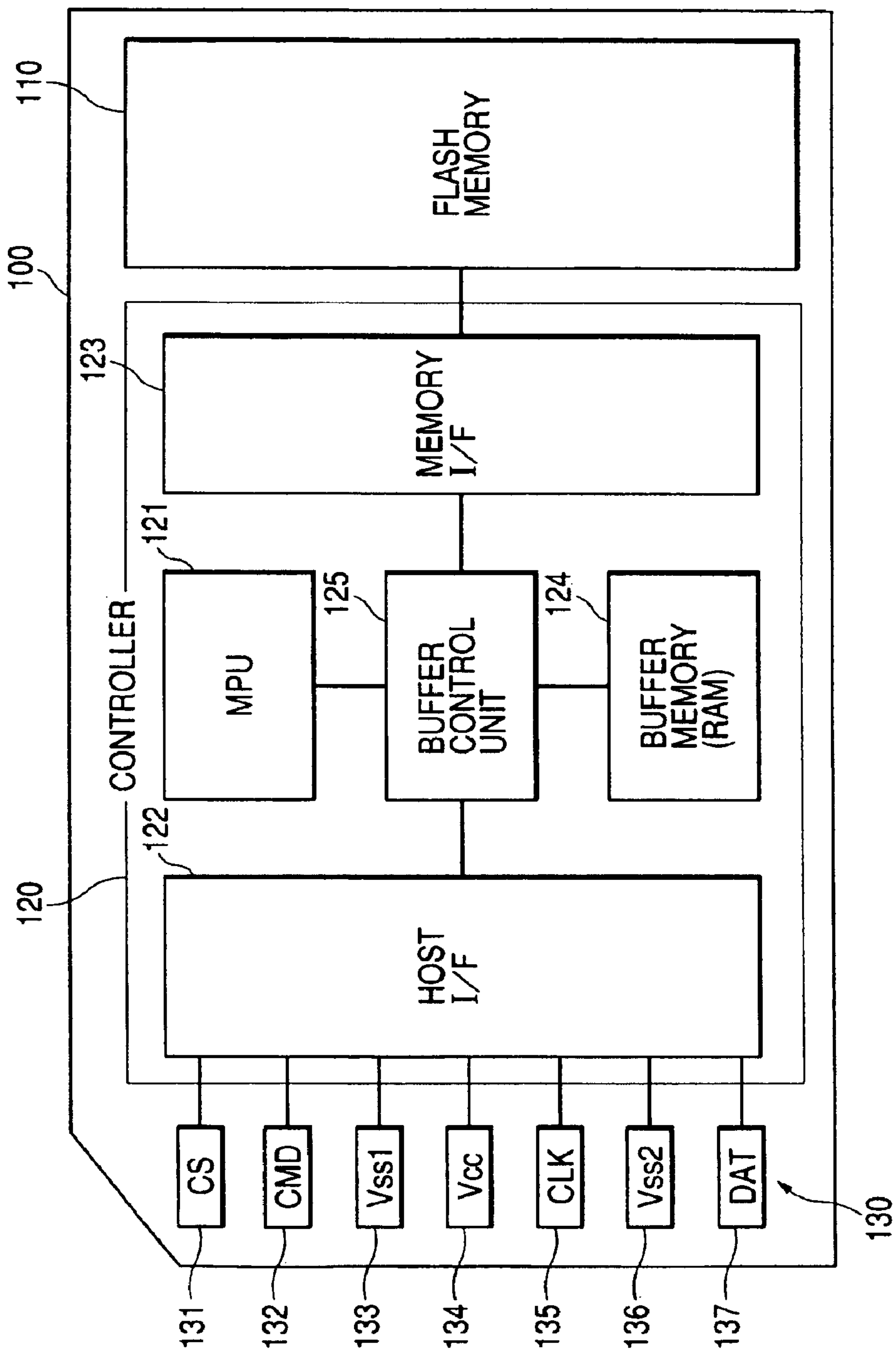
FIG. 1 is a block diagram illustrating an example of structure of a memory card comprising a nonvolatile memory to which the present invention is applied.

FIG. 1 illustrates a first embodiment of a memory card comprising a nonvolatile memory to which the present invention is applied.

Although not particularly restricted, a memory card 100 in this embodiment is composed of a flash memory 110 which can simultaneously delete the data in the predetermined unit and a controller 120 for writing and reading data to and from the flash memory 110 based on the commands supplied from an external circuit. The flash memory 110 and controller 120 are respectively formed as semiconductor integrated circuits on different semiconductor chips. A memory card is formed by mounting these two semiconductor chips on a substrate not illustrated and then molding the entire part with a resin material or accommodating the entire part with a ceramic package or the like.

Moreover, the card is provided, on one side thereof, with an external terminal group 130 which is electrically connected to a circuit on the side of external device, when the card is inserted to a card slot of the external device, to supply the power source to the memory card 100 from the external device and to input or output the signals. These external terminals are connected to a pad as the external terminal of the controller 120 through the printed wirings formed on the substrate or bonding wires. The flash memory 110 and controller 120 may be connected with the printed wiring or with the bonding wires after any one of the controller 120 and flash memory 110 is mounted on the other.

The controller 120 is configured with a microprocessor (MPU) 121 for controlling the entire operations of card such as data transfer, a host interface unit 122 for exchanging signals with external devices, a memory interface unit 123 for exchanging signals with a flash memory 110, a buffer memory 124 consisting of a RAM (random access memory) for temporarily storing commands and write data inputted from external and read data read from the flash memory 110, and a buffer control unit 125 for controlling the data read and write operations for the buffer memory 124. It is also possible for the buffer control unit 125 to provide an error correction code generation and error correction circuit having the function to generate error correction code for the write data to the flash memory 110 and to check and correct the read data based on the error correction code.

The flash memory 110 is configured with a memory array where nonvolatile memory cells, each of which consists of an insulated gate type field effect transistor having a floating gate, are allocated in the shape of matrix, a word decoder for setting the corresponding word lines in the memory array to the selection level by decoding the address signal inputted from external, a data latch connected to the bit lines in the memory array to hold the read data and write data, and a voltage step-up circuit for generating a high voltage required for write and erase operation. This flash memory 110 may be designed to comprise a so-called flash controller which can control the data write and read operations depending on an instruction (command) from the MPU 121 or may be designed not to comprise the flash controller to give the function of the flash controller to the buffer control unit 125 or MPU 121.

Moreover, the flash memory 110 is also configured to operate in accordance with the commands and control signals. As the commands effectively used for the flash memory, there are provided a write command and a erase command or the like in addition to the read command. In addition, as the control signals inputted to the flash memory 110, there are provided a chip selection signal CE, a write control signal WE for indicating the read or write operation, an output control signal OE for giving an output timing, a system clock SC and a command enable signal CDE for indicating the command input or address input. These commands and control signals are supplied from the MPU 121 or the like.

Figure 2:
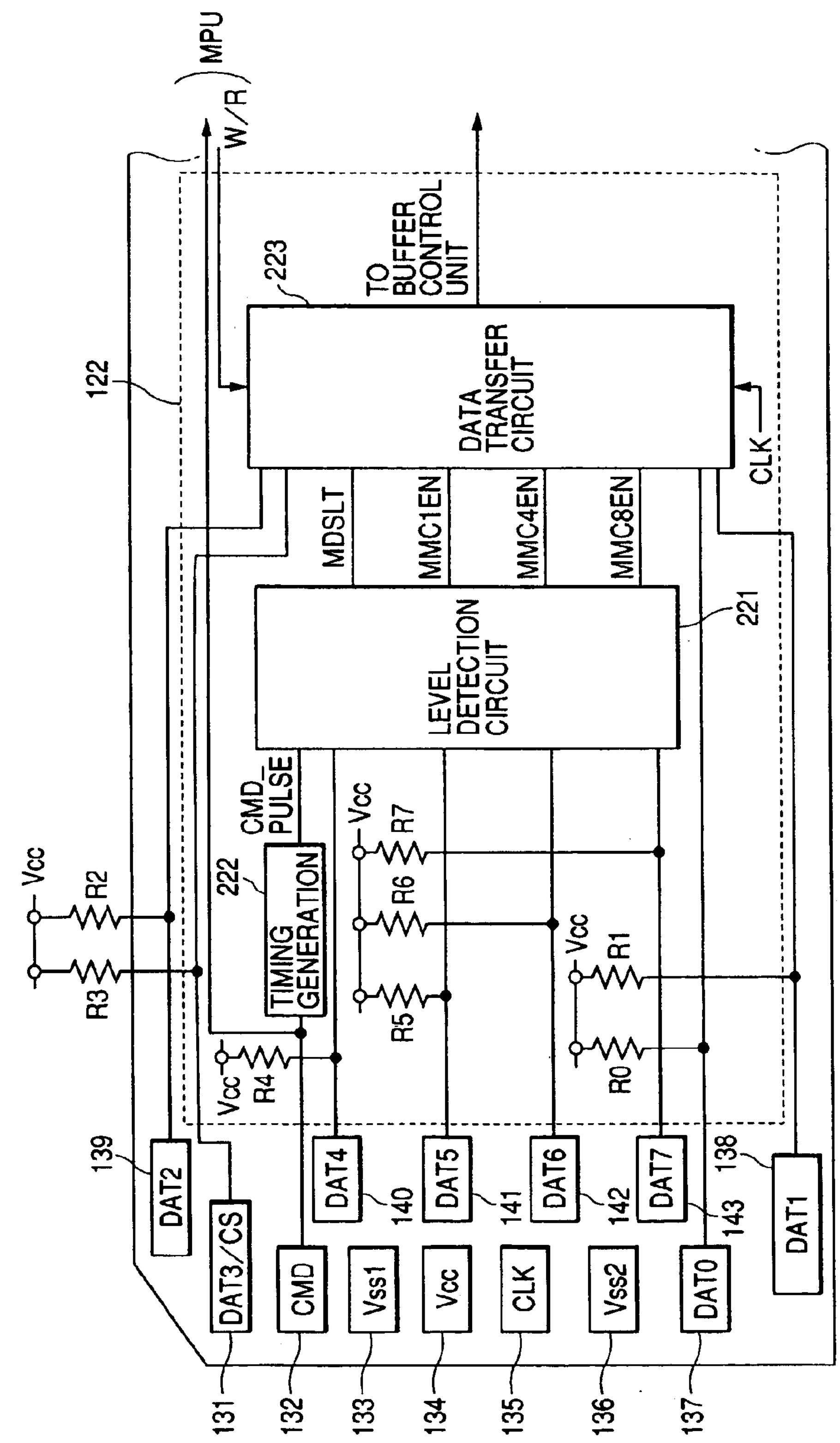
FIG. 2 is a block diagram illustrating a first embodiment of a host interface unit of the memory card of FIG. 1.

FIG. 1 illustrates external terminals provided to the conventional card memory which is called the multimedia card. Details of the external terminals provided to the memory card of this embodiment are illustrated in FIG. 2. This external terminal will be described later.

As illustrated in FIG. 1, the external terminals provided to the conventional card memory called the multimedia card (hereinafter referred to as MMC) include seven terminals, namely a terminal 131 indicating that the card is in the selected condition or enable condition, a command terminal 132 to which the command given to the card from the external device is inputted, two ground terminals 133, 136 for receiving the ground potentials Vss1, Vss2, a power supply-terminal 134 for receiving the power source voltage Vcc, a clock terminal 135 for receiving the clock signal CK to give the timing, and a data terminal 137 for inputting the write data given to the card from the external device and outputting the read data read from the card to the host CPU. As described above, when only one data terminal is provided, the data is inputted and outputted serially.

Meanwhile, the memory card of this embodiment is provided, as illustrated in FIG. 2, with six external terminals 138 to 143 for data input and output, in addition to the external terminals 131 to 137 provided to the conventional multimedia card. In addition, the terminal 131 for indicating that the card is in the selected condition or in the enable condition is also used as the input/output terminal. Accordingly, the memory card of this embodiment is provided, for data input and output, with eight external terminals in total of 131, 137 and 138 to 143. Therefore, the memory card of this embodiment is capable of inputting and outputting in parallel the data of 8-bit in maximum.

FIG. 2 illustrates the elements and circuit blocks related to the present invention among the circuits provided in the host interface unit 122.

As illustrated in FIG. 2, the data input/output terminals 131, 137 to 143 of the memory card of this embodiment are connected with the power source voltage Vcc via the pull-up resistors R0 to R7 and is also provided with a level detection circuit 221 for detecting the level of external terminals, a timing generation circuit 222 for giving the detection timing and a data transfer circuit 223 for data transfer through the switching of the data bus width depending on the control signal from the level detection circuit 221. The level detection circuit 221 may be formed of a logic gate circuit such as an inverter having an adequate logic threshold value or of a comparator for comparing the reference voltage with an input voltage.

To the level detection circuit 221, the potentials of four terminals 140 to 143 among the external terminals 131, 137 to 143 connected with the pull-up resistors R0 to R7 are inputted and the level detection circuit 221 detects whether the potentials of the terminals 140 to 143 are in the high level or low level in the timing of the signal supplied from the timing generation circuit 222 and then generates the control signal depending on the detected level to supply this control signal to the data transfer circuit 223.

The timing generation circuit 222 is formed of a one-shot pulse generation circuit. This timing generation circuit 222 generates a control pulse CMD_PULSE when a command is inputted to the terminal 132 from an external device and then supplies this control pulse to the level detection circuit 221. The signals inputted to the other external terminals 131, 137 to 139 are supplied in direct to the data transfer circuit 223. The command CMD inputted to the external terminal 132 is also supplied to the MPU 121.

Here, the commands inputted to the card from an external device include, for example, a read command for instructing the read operation of the data from the card, a write command for instructing the write operation of data to the card and a reset command for instructing to set the internal condition of card to the initial condition. In this embodiment, the timing generation circuit 222 is configured to generate the control pulse CMD_PULSE even when any command is inputted, but it is also possible to configure the timing generation circuit 222 to generate the control pulse CMD_PULSE only when the predetermined command such as the read command or write comment is inputted. The pull-up resistors R0 to R7 may also be provided as the external elements but these are provided within the controller chip 120 in this embodiment. Thereby, packing density of the card can be enhanced.

Upon reception of the one-shot pulse CMD_PULSE, the level detection circuit 221 outputs, to the data transfer circuit 223, the control signal to instruct to process the write data or read data in unit one bit (serial data transfer) or four bits (4-bit parallel data transfer) or 4-bit and 8-bit (4-bit parallel data or 8-bit parallel data transfer) depending on the potential condition of the external terminals 140 to 143. In the case of 4-bit data, the data is inputted and outputted via the external terminals 131, 137 to 139. In the case of 8-bit data, the data is inputted and outputted via the external terminals 131, 137 to 139.

The control signals supplied to the data transfer circuit 223 from the level detection circuit 221 include, although not particularly restricted, the mode selection signal MDSL and enable signals MMC1EN, MMC4EN, MMC8EN for instructing the bus width in this embodiment.

The data transfer circuit 223 is formed of a data latch circuit and a serial/parallel conversion circuit or the like and operates in response to the control signal from the level detection circuit 221. As an alternative circuit of the data latch circuit and serial/parallel conversion circuit, a circuit such as data selector may be provided. To the data transfer circuit 223, the signal W/R indicating the data transfer direction, namely fetch of the write data from the external terminal or output of read data read from the flash memory 110 is supplied depending on the command inputted from the MPU 121.

Here, it is also possible that the data transfer circuit 223 has the function to transfer the 4-bit or 8-bit data inputted depending on the structure of the internal bus to the buffer control unit 125 after conversion to the 16-bit or 32-bit data or to perform the inverse conversion. Namely, the internal bus is never limited only to 8-bit.

Table 1 illustrates an example of the relationship among the conditions of the external terminals 140 to 143, operation mode determined with the level detection circuit 221 and bus width of data set in the data transfer circuit 223.

TABLE 1

| Mode | Bus Width | DAT7 | DAT6 | DAT5 | DAT4 |
|---|---|---|---|---|---|
| MMC | ×1 | H | H | H | H |
| High-speed | ×1 | L | L | L | L |
| MMC/SMC | ×4 | L | H | L | L |
| | ×8 | H | L | L | L |

TABLE 1-continued

As illustrated in Table 1, when all potentials of the external terminals 140 to 143 are high levels, the level detection circuit 221 outputs the control signal to instruct the fetch of the data signal only from the external terminal 137 to the data transfer circuit 223, upon determination of the conventional MMC mode. More specifically, the mode selection signal MDSLT is set to the high level, while the enable signals MMC1EN, MMC4EN, MMC8EN are all set to the low level.

Moreover, when all potentials of the external terminals 140 to 143 are in the low level, the level detection circuit 221 determines the high speed MMC mode and outputs the control signal to instruct high speed fetch of data signal only from the external terminal 137 to the data transfer circuit 223. More specifically, the mode selection signal MDSLT and enable signal MMC1EN are set to the high level and the enable signals MMC4EN and MMC8EN are set to the low level.

Moreover, when the potential of the terminal 142 (DAT6) among the external terminals 140 to 143 is in the high level, the level detection circuit 221 determines the high speed 4-bit MMC mode and outputs, to the date transfer circuit 223, the control signals to instruct the parallel fetch of the 4-bit data signal from the external terminals 131, 137 to 139. More specifically, the mode selection signal MDSLT and enable signal MMC4EN are set to the high level, while the enable signals MMC1EN and MMC8EN are set to the low level.

Moreover, when the potential of terminal 143 (DAT7) among the external terminals 140 to 143 is in the high level, the level detection circuit 221 determines the high speed 8-bit MMC mode and outputs, to the data transfer circuit 223, the control signal to instruct parallel fetch of the 8-bit data signal from the external terminals 131, 137 to 143. More specifically, the mode selection signal MDSLT and enable signal MMC8EN are set to the high level, while the enable signals MMC1EN and MMC4EN are set to the low level.

The above table 1 illustrates only an example and it is also possible that when the potential of the external terminal 140 (DAT4) or 141 (DAT5) is high level, the level detection circuit 221 determines the high speed 8-bit MMC mode or high speed 4-bit MMC mode. Moreover, when two or three potentials of the external terminals 140 (DAT4) to 143 (DAT7) are high level, the level detection circuit 221 determines the high speed 8-bit MMC mode or high speed 4-bit MMC mode. In summary, the relationship between the combination of potentials of the external terminals 140 (DAT4) to 143 (DAT7) and the mode can be set freely, except for the conventional MMC mode.

Next, operations of the memory card of the first embodiment configured as described above will be described using the timing charts of FIG. 3 to FIG. 6.

Figure 3:
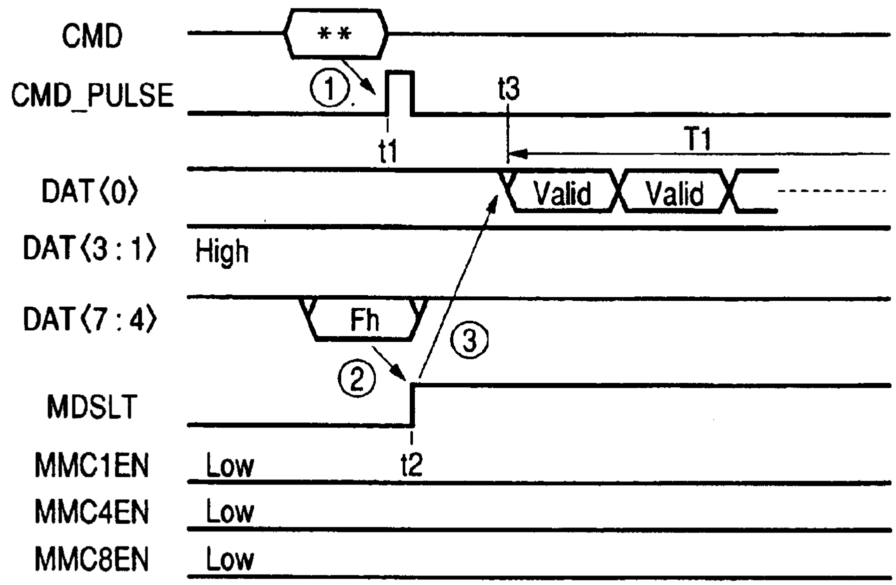
FIG. 3 is a timing chart for describing operations of the host interface unit of the memory card of the first embodiment in the case where a device comprising an inserted card corresponds to a conventional MMC.

When a memory card is inserted into the slot of an external device and commands are inputted to the external terminal 132 of the card from the external device, the control pulse CMD_PULSE is generated (timing t1) as illustrated in FIG. 3. In the case where the card slot of the external device to which the memory card is inserted corresponds to the conventional MMC having only seven external terminals as illustrated in FIG. 1, the external terminals 138 to 143 are left unconnected. Therefore, these are set to the high level (power source voltage Vcc) with the pull-up resistors R1 to R7.

Therefore, the level detection circuit 221 detects that all potentials of the external terminals 140 to 143 are in the high level and determines the connected device as the external device corresponding to the conventional MMC. Accordingly, only the signal MDSLT among the signals MDSLT and MMC1EN to MMC8EN supplied to the data transfer circuit 223 is varied to the high level from the low level (timing t2 of FIG. 3).

When the command inputted from the external device connected is the write command, the data transfer circuit 223 starts to fetch the data (DAT0) inputted serially from the external terminal 137 by receiving such command (timing t3) Moreover, when the command inputted from the external device connected is the read command, the data transfer circuit 223 outputs the data read from the flash memory 110 to the terminal 131 as the serial data. In this case, the data is inputted and outputted based on the clock signal CLK being inputted to the external terminal 135.

Next, the slot of the external device to which a memory card is inserted is provided corresponding to the card having the external terminals 138 to 143 in addition to the seven external terminals provided to the conventional MMC. When a command is inputted under the condition that a low level potential is inputted to all the external terminals 140 to 143 from the external device, the level detection circuit 221 detects that the potential of the external terminals 140 to 143 is low level and determines the external device as that corresponding to the high speed MMC to change the signals MDSLT and MMC1EN to the high level from the low level among the signals MDSLT, MMC1EN to MMC8EN supplied to the data transfer circuit 223 (timing t12 of FIG. 4).

Upon reception of these signals, the data transfer circuit 223 starts to fetch or output the data (DAT0) inputted in serial from the external terminal 137 (timing t13). In this case, as will be understood from the period T1 of FIG. 3 and FIG. 4, the data fetch or output is conducted at a higher rate than the data fetch or output of the MMC data of the conventional type.

Next, since the slot of the external device to which a memory card is inserted corresponds to the card having the external terminals 138 to 143 in addition to the seven external terminals provided to the card of the conventional type, when a low level potential is inputted to the terminals 140, 141, 143 among the external terminals 140 to 143 from the external device, only the potential of the terminal 142 is set to the high level (power source voltage Vcc) with the pull-up resistor R6.

When a command is inputted from the external device under this condition, the level detection circuit 221 detects that the potential of the external terminal 142 is high level and the potentials of the external terminals 140, 141, 143 are low level to determine the external device as that corresponding to the high speed 4-bit MMC. Thereby, the level detection circuit 221 varies the signals MDSLT and MMC4EM to the high level from the low level among the signals MDSLT and MMC1EN to MMC8EN supplied to the data transfer circuit 223 (timing t22 of FIG. 5).

When the command inputted from the external device connected is the write command, the data transfer circuit 223 starts, upon reception of this command, to fetch the 4-bit parallel data from the external terminals 131 and 137 to 139 (timing t23). Moreover, when the command inputted is the read command, the data read from the flash memory 110 is outputted to the terminals 131 and 137 to 139 as the 4-bit parallel data.

Next, the slot of the external device to which a memory card is inserted corresponds to the card having the external terminals 138 to 143 in addition to the seven external terminals provided to the card of the conventional type. Therefore, when a low level potential is inputted to the terminals 140 to 142 among the external terminals 140 to 143 from the external device, the potential of only the terminal 143 is set to the high level (power source voltage Vcc) with the pull-up resistor R7.

Figure 6:
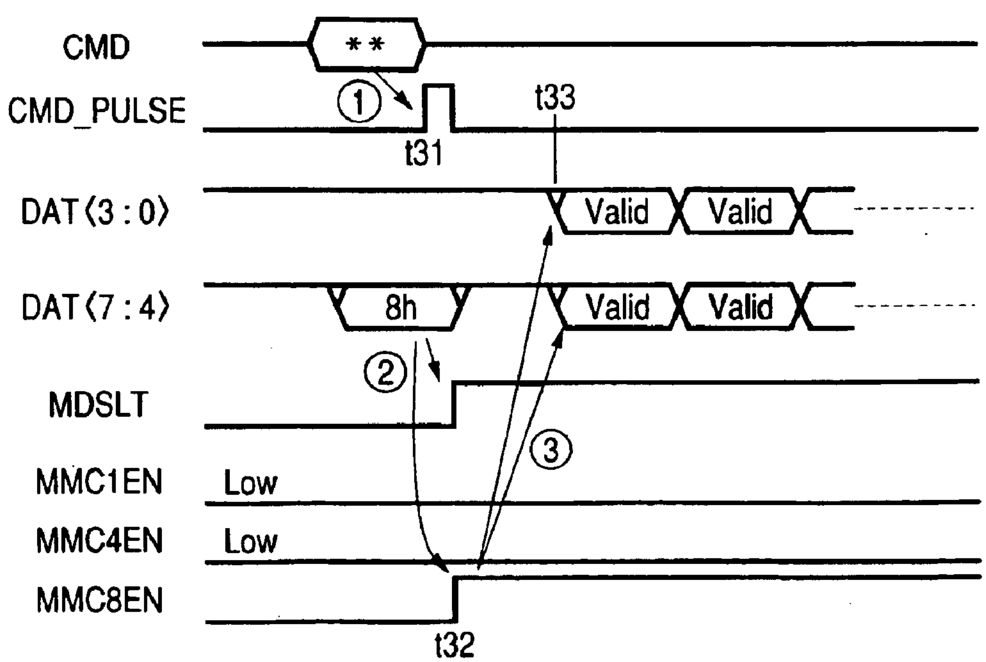
FIG. 6 is a timing chart for describing operations of the host interface unit of the memory card of the first embodiment in the case where the device comprising the inserted card corresponds to a high speed 8-bit MMC.

When a command is inputted from the external device under this condition, the level detection circuit 221 detects that the potential of the external terminal 143 is high level and the potential of the external terminals 140, 141, and 142 is low level and determines the external device as that corresponding to the high speed 8-bit MMC to change the signals MDSLT and MMC8EN to the high level from the low level among the signals MDSLT, MMC1EN to MMC8EN supplied to the data transfer circuit 223 (timing t32 of FIG. 6).

When the command inputted from the external device connected is the write command, the data transfer circuit 223 starts to fetch the 8-bit parallel data from the external terminals 131, 137 to 143 (timing t33). Moreover, when the input command is the read command, the data read from the flash memory 110 is outputted to the terminals 131, 137 to 143 as the 8-bit parallel data.

Next, the second embodiment of the memory card of the present invention will be described with reference to FIG. 7 and FIG. 8.

The difference between the second embodiment and the first embodiment is that the level detection circuit 221 determines the operation mode from the conditions of the four external terminals 140 to 143 in the first embodiment, while the level detection circuit 221 determines the operation mode from the conditions of eight external terminals 131, 137 to 143 in the second embodiment. Therefore, in the second embodiment, the potential of the external terminals 131, 137 to 139 is also inputted to the level detection circuit 221, in addition to the potential of the external terminals 140 to 143. In addition, the level detection circuit 221 generates, depending on the conditions of these terminals, the eight signals DAT7EN to DAT0EN which indicate validity of input to the terminal and then supplies these signals to the data transfer circuit 223.

Accordingly, the memory card of the second embodiment results in the merits that the data transfer of desired number of bits, such as 2-bit parallel transfer, 3-bit parallel transfer and 6-bit parallel transfer are possible in addition to the serial data transfer, 4-bit parallel transfer and 8-bit parallel transfer and the terminal for data input and output can be determined as desired from the terminals 131, 137 to 143.

Figure 8:
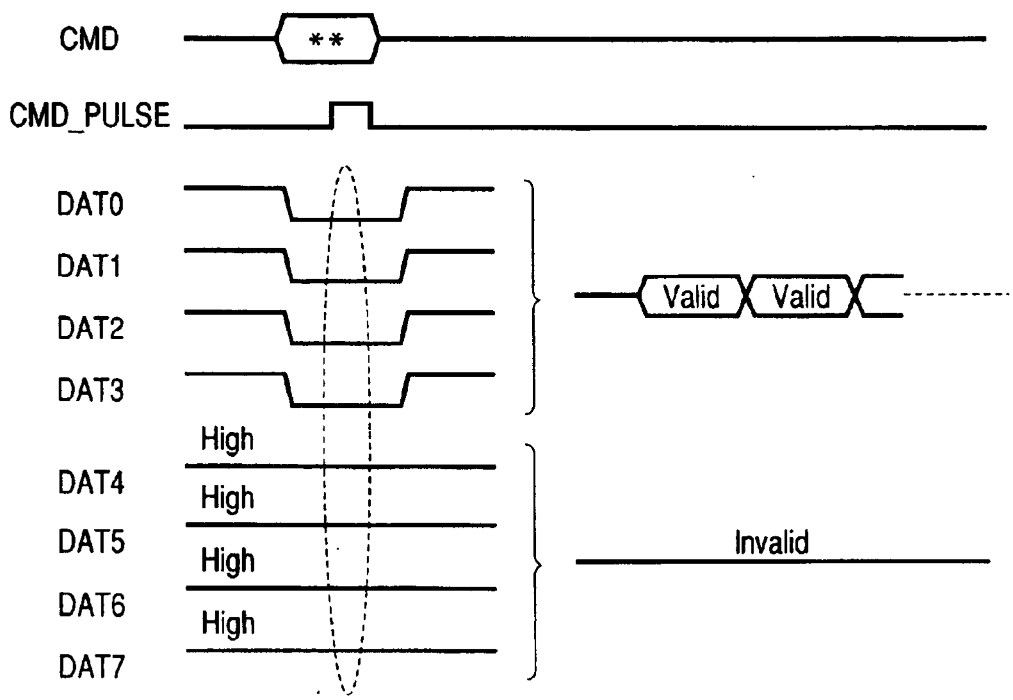
FIG. 8 is a timing chart for describing operations of the host interface unit of the memory card of the second embodiment in the case where the device comprising the inserted card corresponds to the high speed 4-bit MMC.
Figure 1:
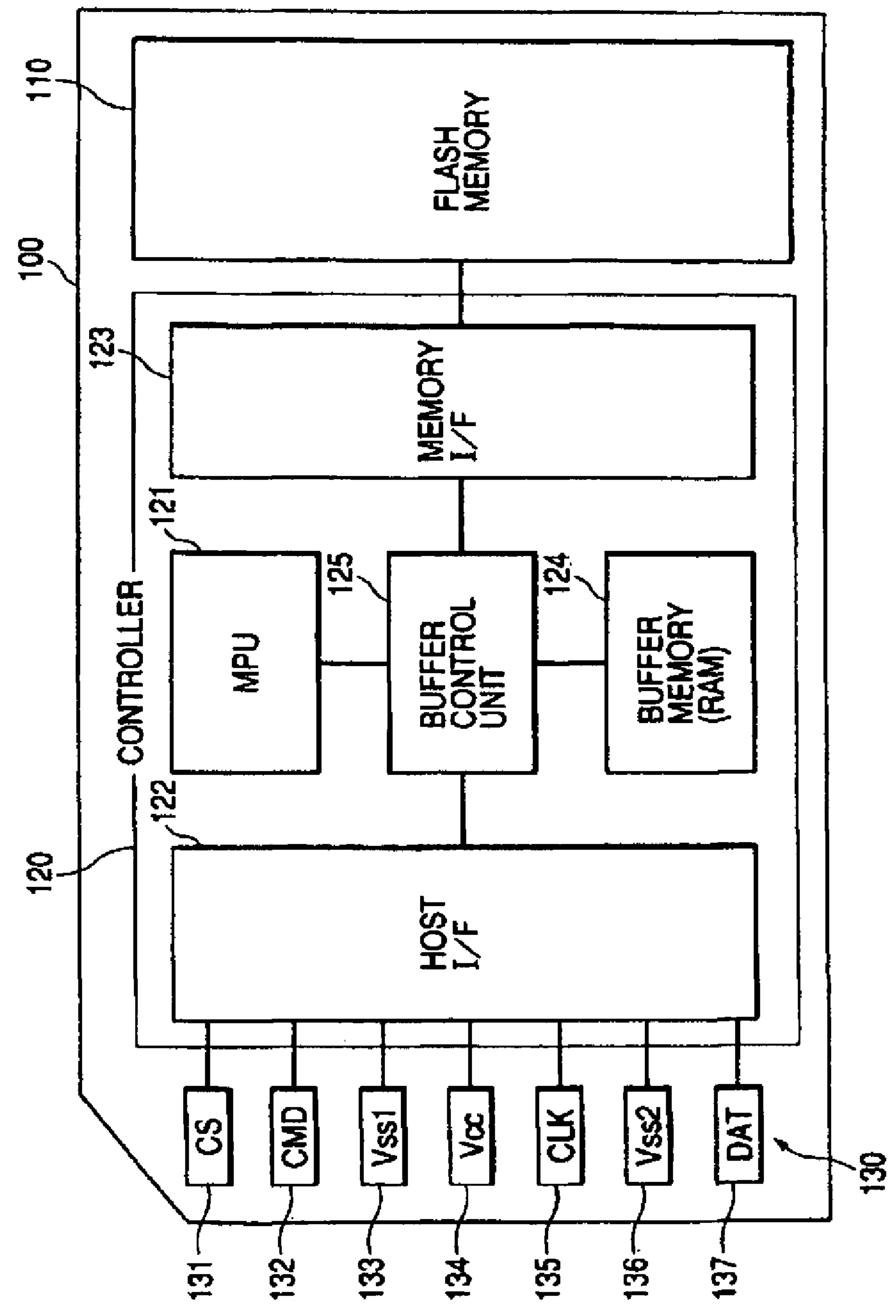
Figure 2:
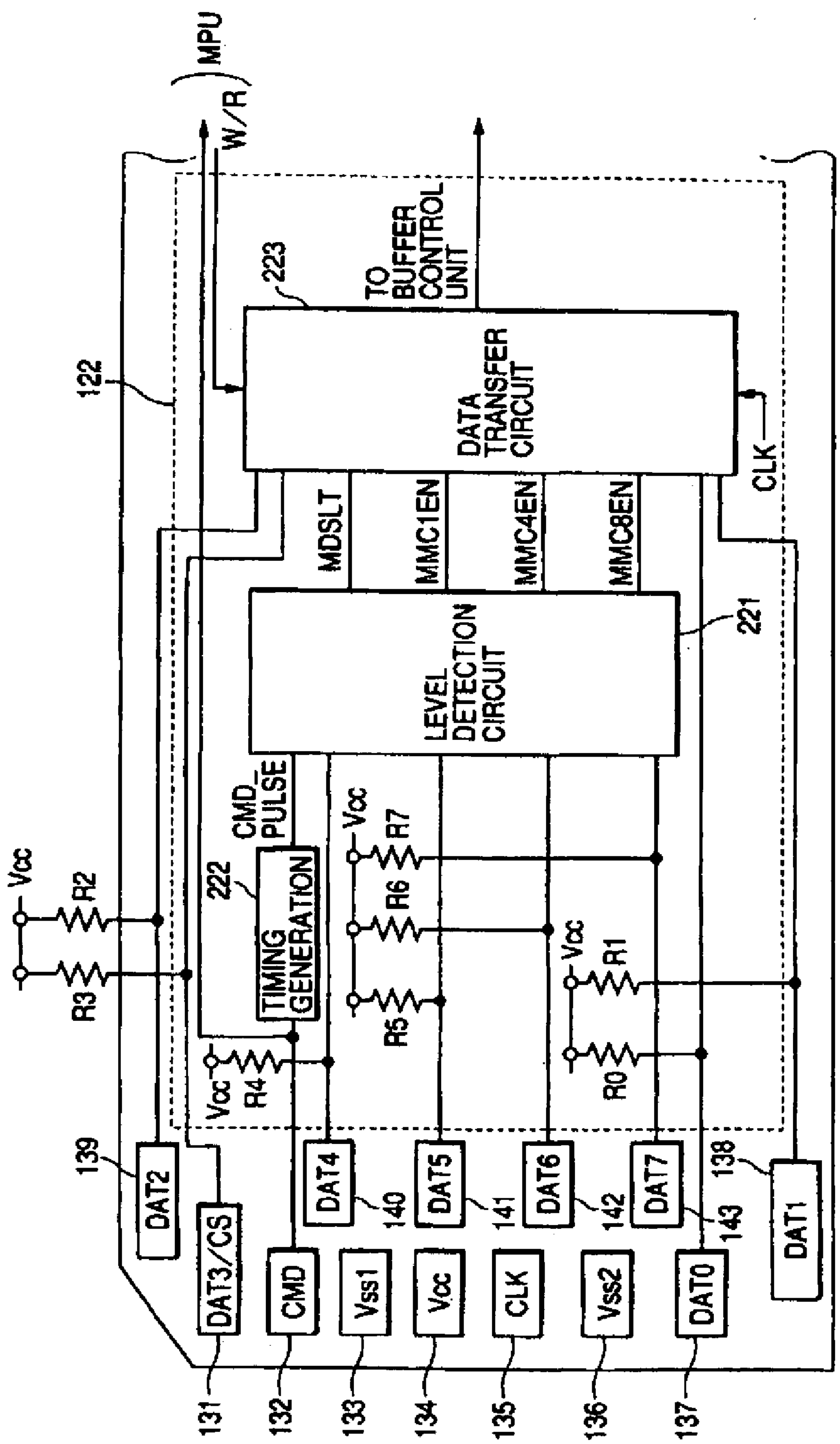
Figure 3:
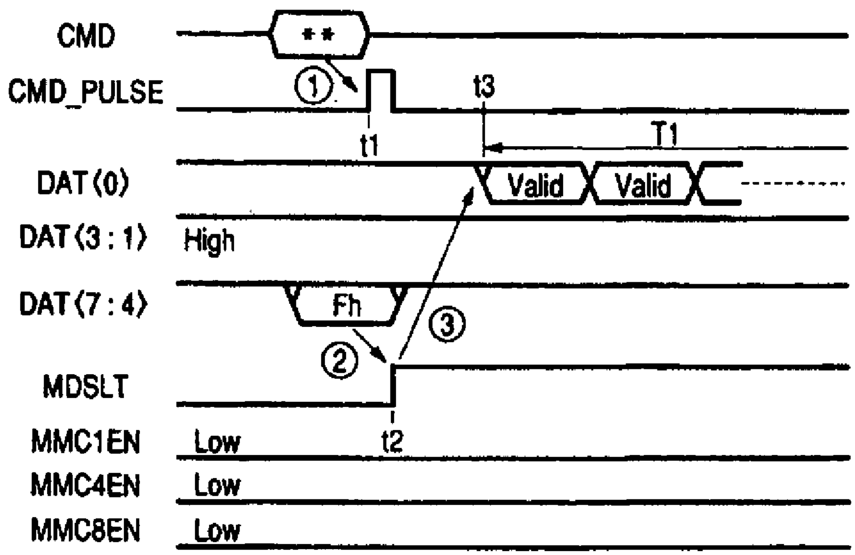
Figure 4:
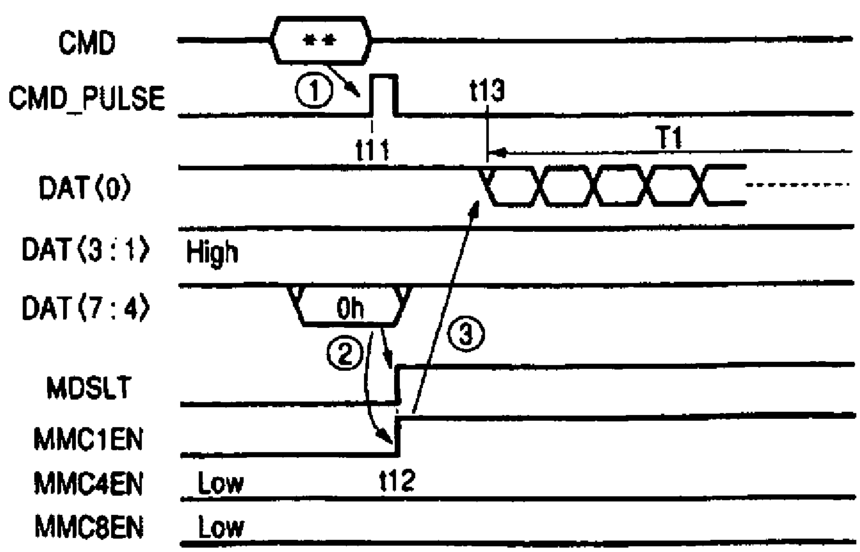
Figure 5:
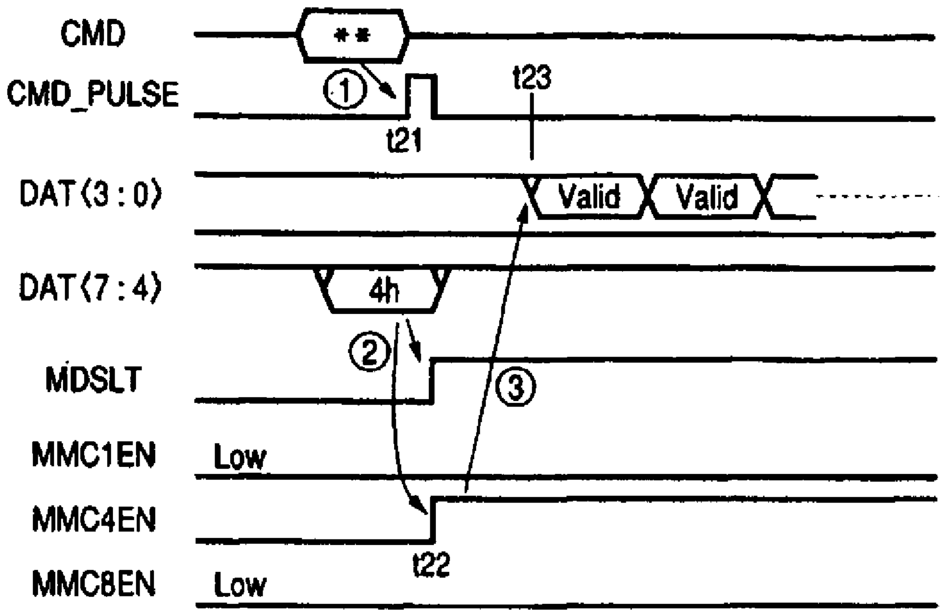
Figure 6:
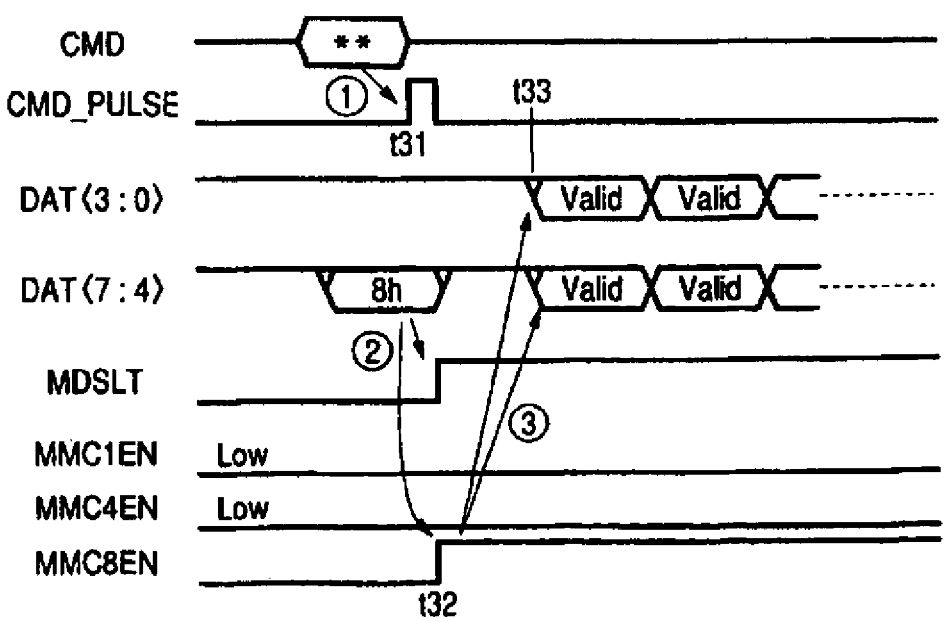
Figure 7:
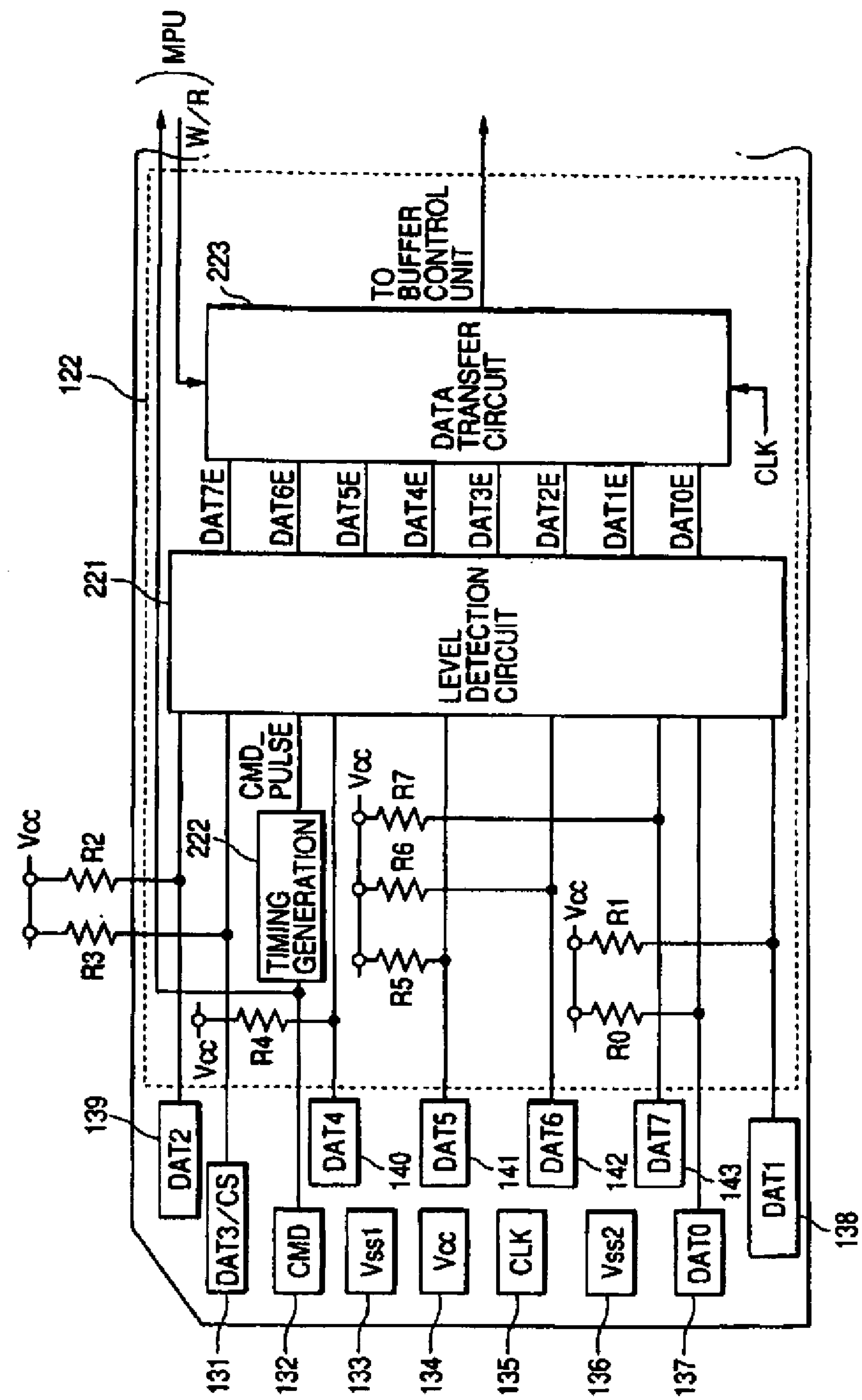
Figure 8:
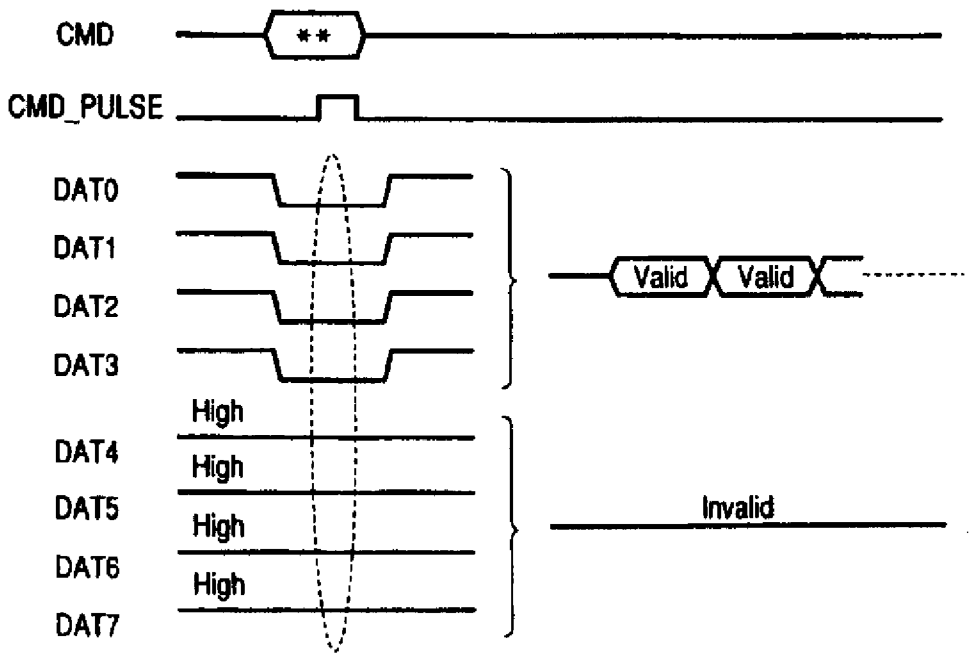

FIG. 8 illustrates the timings of operations when the potential of the terminals 131, 137 to 139 of the memory card of the second embodiment configured as described above is set to the low level, while the potential of the terminals 140 to 143 is set to high level. Even in this embodiment, the level detection circuit 221 determines a type of the external device by detecting potential conditions of the external terminals 131, 137 to 143 when the command is inputted.

As illustrated in FIG. 8, when the potential of DAT0 to DAT3 among the potentials DAT0 to DAT7 of the external terminals 131, 137 to 143 is low level and the potential of DAT4 to DAT7 is high level when the command is inputted, the level detection circuit 221 varies only the signals DAT3EN to DAT0EN among the signals DAT7EN to DAT0EN for the data transfer circuit 223 to the valid level (for example, high level) in order to notify, to the data transfer circuit 223, that the data DAT0 to DAT3 of the terminals 132, 137 to 139 are valid, while the data DAT4 to DAT7 of the terminals 140 to 143 are invalid.

Thereby, the data transfer circuit 223 fetches only the data DAT0 to DAT3 and transfers the data to the buffer control unit 123 when the input command is the write command. In addition, when the input command is the read command, the data read from the flash memory 110 is outputted to the terminals 131, 137 to 139 as the 4-bit parallel data.

The present invention has been described practically based on the preferred embodiments thereof but the present invention is never limited only to these embodiments and naturally allows various changes and modifications within the scope not departing from the claims thereof. For example, in the embodiments, the present invention has been applied to a multimedia card (MMC), but the present may also be applied to a memory card called an SMC (Secure Mobile Card) which has the similar specifications and improved security to prevent illegal copying of the work such as music contents and a memory card of the other specifications. In addition, the structure of controller chip 120 is not limited only to that of FIG. 1 and the chip controller 120 is also allowed even when it does not include, for example, the buffer memory 124 and the buffer control unit 125.

In above description, the present invention has been mainly applied to a memory card comprising a flash memory which is the major application field as the background but the present invention is never limited thereto. Namely, the present invention can also be utilized for a memory card comprising an EEPROM chip or other nonvolatile memory chips or to a memory module in which a plurality of nonvolatile memories and the control LSI may be mounted on a printed wiring substrate.

Briefly, the present invention can provide the following effects.

Namely, according to the present invention, high speed data transfer may be realized while compatibility of a card type storage device comprising a nonvolatile memory is ensured.

What is claimed is:

1. A nonvolatile storage device comprising:

a plurality of external terminals;

a controller; and a nonvolatile memory, said controller controlling storage operation of data inputted from said external terminals to a region designated by said nonvolatile memory depending on control information inputted from any of said plurality of external terminals, wherein the nonvolatile storage device includes: a plurality of external data terminals to which a data signal is inputted; pull-up circuit for pulling up the external data terminals up to a power source voltage; level detection circuit for detecting a potential of said external data terminals; and a data transfer circuit for selectively fetching the data signal inputted to said plurality of external data terminals and then transferring the data signal to an internal circuit as data of a predetermined bus width, and wherein said level detection circuit detects a potential of a predetermined terminal of said plurality of external data terminals when said control information is inputted, and said data transfer circuit determines said bus width depending on a combination of potentials of the predetermined external data terminals.

2. The nonvolatile storage device according to claim 1, wherein eight terminals are provided in total as said external data terminals and the potentials of four external data terminals are detected by said level detection circuit.

3. The nonvolatile storage device according to claim 2, wherein when said level detection circuit detect that the potentials of said four external data terminals are all higher than the predetermined potential, said data transfer circuit fetches the data signal inputted to any one among said predetermined external data terminals and then transfers the data signal to the internal circuit.

4. The nonvolatile storage device according to claim 3, wherein when said level detection circuit detect that potential of first terminal of said four external data terminals is lower than the predetermined potential, said data transfer circuit fetches the data signal inputted to any one of said predetermined external data terminals at a higher rate than a rate when the potentials of said four external data terminals are all higher than the predetermined potential and then transfers the data signal to the internal circuit.

5. The nonvolatile storage device according to claim 4, wherein when said level detection circuit detect that potential of second terminal of said four external data terminals is lower than the predetermined potential, said data transfer circuit fetches the data signals inputted to the four external data terminals other than said predetermined external data terminals and then transfers the data signals to the internal circuit.

6. The nonvolatile storage device according to claim 5, wherein when said level detection circuit detect that potential of third terminal of said four external terminals is lower than the predetermined potential, said data transfer circuit fetches the data signals inputted to all of said eight external data terminals and then transfers these data signals to the internal circuit.

7. The nonvolatile storage device according to claim 6, wherein any one of said eight external data terminals is also used as a terminal to which a control signal is inputted.

8. The nonvolatile storage device according to claim 7, wherein said pull-up circuit are also formed on a semiconductor chip where said controller is formed.

9. The nonvolatile storage device according to claim 8, further comprising a volatile memory for storing data which is fetched from said external data terminal and is then transferred by said data transfer circuit before the same data is written to said nonvolatile memory.

10. The nonvolatile storage device according to claim 9, further comprising a timing generation circuit for notifying a detection timing of said level detection circuit by detecting the input of said control signal.

* * * * *

UNITED STATES PATENT AND TRADEMARK OFFICE

CERTIFICATE OF CORRECTION

PATENT NO. : 6,972,979 B2
APPLICATION NO. : 10/716504
DATED : December 6, 2005
INVENTOR(S) : Iida et al.

It is certified that error appears in the above-identified patent and that said Letters Patent is hereby corrected as shown below:

Please delete patent 6972979 in its entirety and insert patent 6972979 in its entirety as shown on the attached pages.

Signed and Sealed this
Twenty-third Day of December, 2014

Michelle K. Lee

Michelle K. Lee
*Deputy Director of the United States Patent and Trademark Office*

(12) United States Patent
Iida et al.

(10) Patent No.: US 6,972,979 B2
(45) Date of Patent: Dec. 6, 2005

(54) NONVOLATILE MEMORY

(75) Inventors: Tetsuya Iida, Kokubunji (JP); Motoki Kanamori, Tachikawa (JP); Atsushi Shikata, Higashimurayama (JP); Takayuki Tamura, Higashiyamato (JP); Kunihiro Katayama, Chigasaki (JP)

(73) Assignee: Renesas Technology Corp., Tokyo (JP)

(*) Notice: Subject to any disclaimer, the term of this patent is extended or adjusted under 35 U.S.C. 154(b) by 86 days.

(21) Appl. No.: 10/716,504

(22) Filed: Nov. 20, 2003

(65) Prior Publication Data

US 2004/0156242 A1 Aug. 12, 2004

(30) Foreign Application Priority Data

Feb. 7, 2003 (JP) ........................................ 2003-030309

(51) Int. Cl.[7] ........................................ G11C 5/02
(52) U.S. Cl. .................. 365/51; 365/189.07; 365/233.5
(58) Field of Search ........................ 365/51, 52, 189.07, 365/189.11, 233.5

(56) References Cited

U.S. PATENT DOCUMENTS

| | | | | |
|---|---|---|---|---|
| 5,517,447 A | * | 5/1996 | Bolan et al. | 365/149 |
| 5,825,882 A | * | 10/1998 | Kowalski et al. | 713/172 |
| 5,963,473 A | * | 10/1999 | Norman | 365/185.02 |
| 6,353,553 B1 | * | 3/2002 | Tamada et al. | 365/185.03 |
| 6,669,487 B1 | * | 12/2003 | Nishizawa et al. | 439/60 |
| 2001/0009505 A1 | | 7/2001 | Nishizawa et al. | 361/737 |
| 2003/0112611 A1 | | 6/2003 | Nishizawa et al. | 361/763 |

FOREIGN PATENT DOCUMENTS

| | | |
|---|---|---|
| JP | 2001-209773 | 8/2001 |
| WO | WO 01/84490 | 11/2001 |

* cited by examiner

*Primary Examiner*—Gene N. Auduong
(74) *Attorney, Agent, or Firm*—Miles & Stockbridge P.C.

(57) ABSTRACT

There is provided a technology to realize high speed data transfer while compatibility of a card type storage device comprising a nonvolatile memory is ensured. Namely, in the card type storage device comprising the nonvolatile memory, a plurality of data terminals are provided and an interface unit is provided with a circuit for determining levels of data terminals. Some or all of the plurality of data terminals are connected with pull-up resistors for pulling up to a power source voltage. When the determination circuit determines that the data terminals connected with the pull-up resistors are in an open condition, the determination circuit switches a bus width (number of bits) of data.

10 Claims, 6 Drawing Sheets

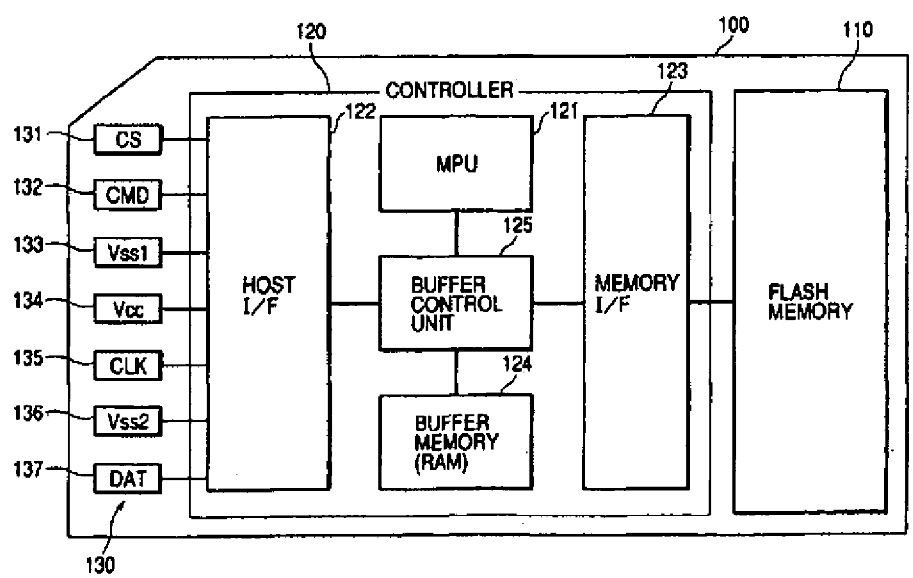

NONVOLATILE MEMORY

BACKGROUND OF THE INVENTION

The present invention relates to a technology which may be effectively applied to a nonvolatile storage device and more particularly to a technology which may be applied effectively to a card type storage device comprising a nonvolatile semiconductor memory, for example, a flash memory.

In recent years, a card type storage device which is called a memory card comprising a nonvolatile memory such as a flash memory, which can store storage data even when supply of power source voltage is stopped, has been used widely as a data memory medium of a mobile electronic device such as a digital camera.

In regard to the conventional memory card, data has generally been inputted and outputted serially between a card which is represented by a multimedia card (MultiMediaCard (registered trade mark) and a card reader. The reasons considered are that it is difficult, from the viewpoint of manufacture, to provide a sufficient number of external terminals because a memory card is small in size (as small as stamp) and it becomes difficult to realize electrical connection between a card and a card reader because interval of terminals becomes narrow when many terminals are provided.

SUMMARY OF THE INVENTION

However, with development of manufacturing technology in recent years, the number of terminals to be provided to a memory card has been increasing. The inventors of the present invention have discussed the way of realizing high speed data transfer by increasing the number of data terminals to be provided to a memory card in view of inputting and outputting in parallel the data.

As a result, it has become apparent that the number of terminals may be increased but here rises a problem that data read/write is impossible when a card is inserted to the existing card reader even if a memory card having a large number of terminals is used without considering compatibility.

An object of the present invention is to provide a technology to realize high speed data transfer while compatibility in a card type storage device comprising a nonvolatile memory is ensured.

The aforementioned and other objects and novel features of the present invention will become apparent from the description of the present specification and the accompanying drawings.

Typical inventions disclosed in this specification will be described as follows.

Namely, a card type storage device comprising a nonvolatile memory has a structure that a plurality of data terminals (for example, eight terminals) are provided and a circuit for determining a signal level at the data terminal is also provided to an interface unit, a pull-up resistor is also provided for pulling up all or some (for example, four terminals) of a plurality of data terminals to the power source voltage, and when the determination circuit determines that the data terminals connected with the pull-up resistor is in the open condition, the data transfer rate or bus width (number of parallel bits) of data transfer is switched.

According to the means described above, since a conventional card reader cannot input a signal to the data terminals additionally provided to a card type storage device comprising a plurality of data terminals, the data terminal to which the signal is not inputted because a pull-up resistor is connected remain pulled up to the power source voltage. Therefore, the determination circuit can determine the open condition by detecting the level of data terminals. Accordingly, compatibility with the conventional storage device can be ensured by determining the data transfer rate or data transfer width based on the result of determination.

Moreover, when a card reader may be used for a storage device comprising a plurality of data terminals, an amount of data to be transferred within the unit time may be increased in order to attain high speed data transfer by increasing data transfer rate or expanding bus width in data transfer. Here, it is desirable that the level of data terminal is determined with the determination circuit in such a timing that a command is inputted from an external circuit. Thereby, an increase of power consumption may be avoided by shortening the period during which the level of data terminal connected with a pull-up resistor is varied.

Here, it is more desirable that any one terminal among the external data terminals is used as the terminal in common to which a control signal is inputted. Accordingly, the number of external terminals provided to a card type storage device can be reduced to enable input and output of data of the desired number of bits. It is still more desirable that the pull-up resistor is formed on a semiconductor chip where a controller is formed. Thereby, the number of components to be mounted can be reduced and mounting density of the card type storage device can also be raised.

BRIEF DESCRIPTION OF THE DRAWINGS

FIG. 1 is a block diagram illustrating an example of structure of a memory card comprising a nonvolatile memory to which the present invention is applied.

FIG. 2 is a block diagram illustrating a first embodiment of a host interface unit of the memory card of FIG. 1.

FIG. 3 is a timing chart for describing operations of the host interface unit of the memory card of the first embodiment in the case where a device comprising an inserted card corresponds to a conventional MMC.

Figure 4:
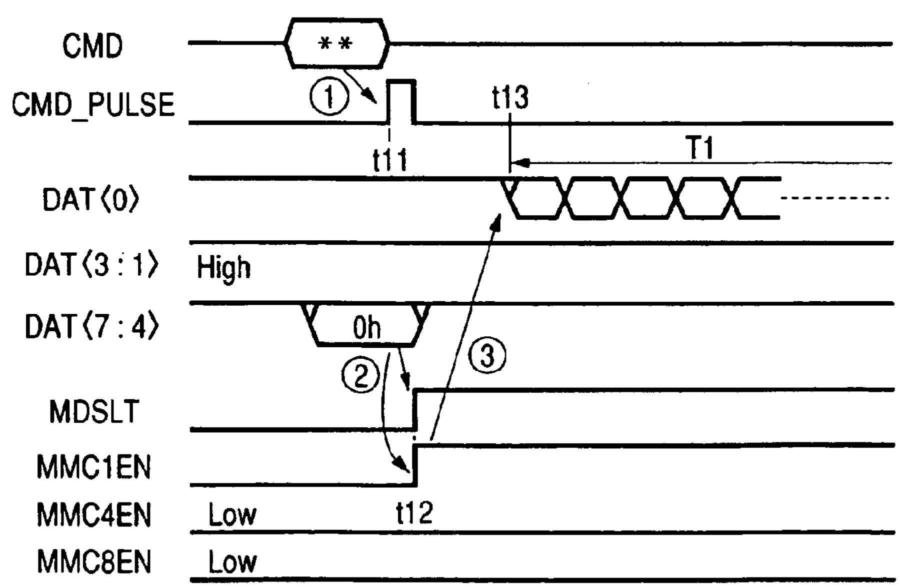
FIG. 4 is a timing chart for describing operations of the host interface unit of the memory card of the first embodiment in the case where the device comprising the inserted card corresponds to a high speed serial MMC.

FIG. 4 is a timing chart for describing operations of the host interface unit of the memory card of the first embodiment in the case where the device comprising the inserted card corresponds to a high speed serial MMC.

Figure 5:
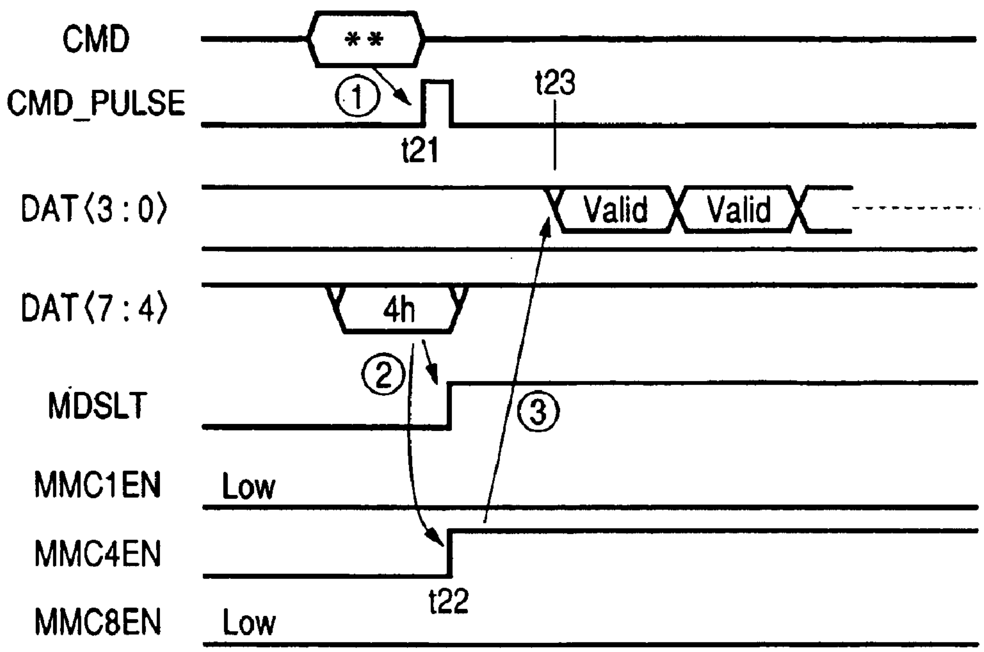
FIG. 5 is a timing chart for describing operations of the host interface unit of the memory card of the first embodiment in the case where the device comprising the inserted card corresponds to a high speed 4-bit MMC.

FIG. 5 is a timing chart for describing operations of the host interface unit of the memory card of the first embodiment in the case where the device comprising the inserted card corresponds to a high speed 4-bit MMC.

FIG. 6 is a timing chart for describing operations of the host interface unit of the memory card of the first embodiment in the case where the device comprising the inserted card corresponds to a high speed 8-bit MMC.

Figure 7:
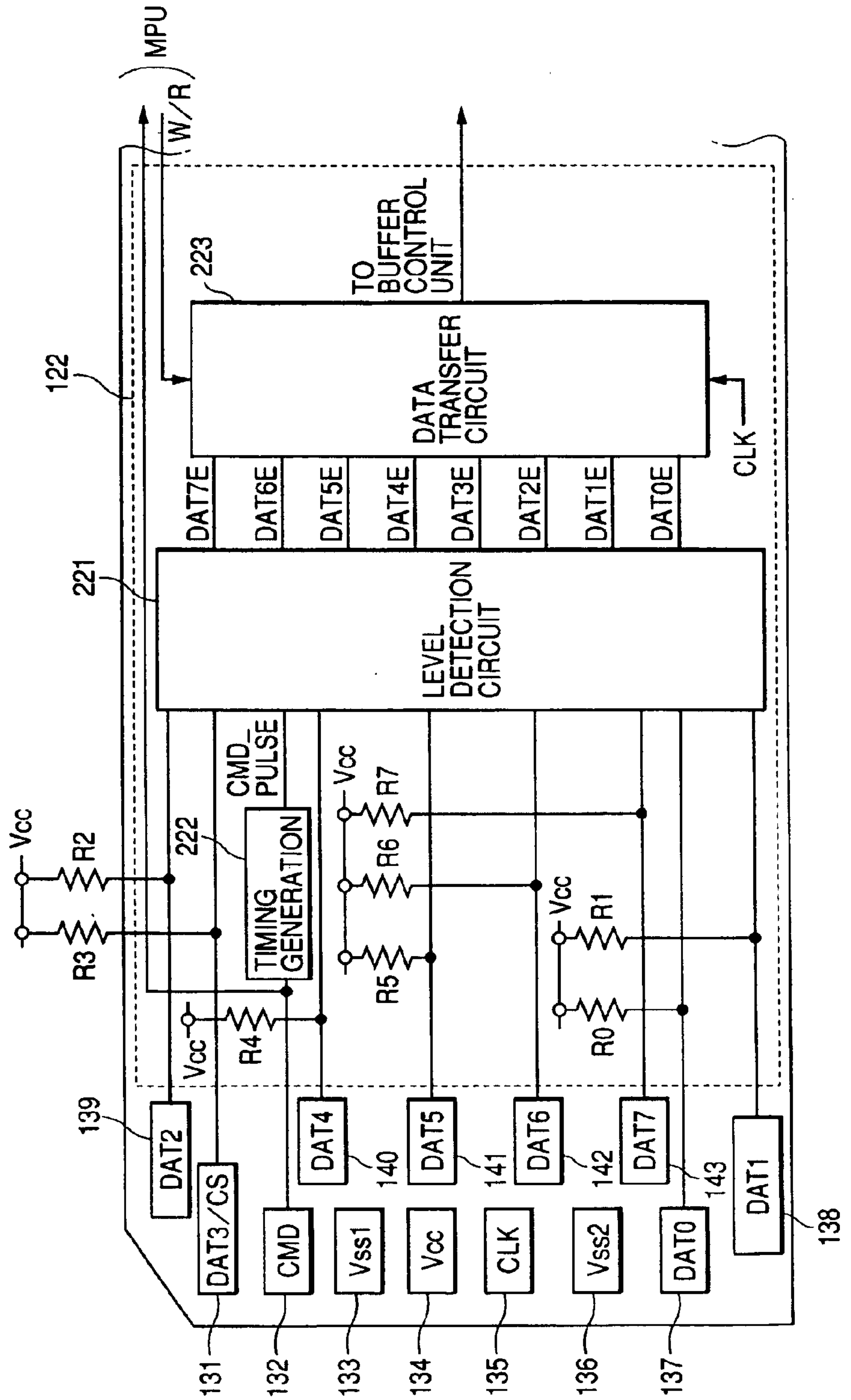
FIG. 7 is a block diagram illustrating a second embodiment of the host interface unit of the memory card to which the present invention is applied.

FIG. 7 is a block diagram illustrating a second embodiment of the host interface unit of the memory card to which the present invention is applied.

FIG. 8 is a timing chart for describing operations of the host interface unit of the memory card of the second embodiment in the case where the device comprising the inserted card corresponds to the high speed 4-bit MMC.

DETAILED DESCRIPTION OF THE PREFERRED EMBODIMENTS

The preferred embodiments of the present invention will be described with reference to the accompanying drawings.

FIG. 1 illustrates a first embodiment of a memory card comprising a nonvolatile memory to which the present invention is applied.

Although not particularly restricted, a memory card 100 in this embodiment is composed of a flash memory 110 which can simultaneously delete the data in the predetermined unit and a controller 120 for writing and reading data to and from the flash memory 110 based on the commands supplied from an external circuit. The flash memory 110 and controller 120 are respectively formed as semiconductor integrated circuits on different semiconductor chips. A memory card is formed by mounting these two semiconductor chips on a substrate not illustrated and then molding the entire part with a resin material or accommodating the entire part with a ceramic package or the like.

Moreover, the card is provided, on one side thereof, with an external terminal group 130 which is electrically connected to a circuit on the side of external device, when the card is inserted to a card slot of the external device, to supply the power source to the memory card 100 from the external device and to input or output the signals. These external terminals are connected to a pad as the external terminal of the controller 120 through the printed wirings formed on the substrate or bonding wires. The flash memory 110 and controller 120 may be connected with the printed wiring or with the bonding wires after any one of the controller 120 and flash memory 110 is mounted on the other.

The controller 120 is configured with a microprocessor (MPU) 121 for controlling the entire operations of card such as data transfer, a host interface unit 122 for exchanging signals with external devices, a memory interface unit 123 for exchanging signals with a flash memory 110, a buffer memory 124 consisting of a RAM (random access memory) for temporarily storing commands and write data inputted from external and read data read from the flash memory 110, and a buffer control unit 125 for controlling the data read and write operations for the buffer memory 124. It is also possible for the buffer control unit 125 to provide an error correction code generation and error correction circuit having the function to generate error correction code for the write data to the flash memory 110 and to check and correct the read data based on the error correction code.

The flash memory 110 is configured with a memory array where nonvolatile memory cells, each of which consists of an insulated gate type field effect transistor having a floating gate, are allocated in the shape of matrix, a word decoder for setting the corresponding word lines in the memory array to the selection level by decoding the address signal inputted from external, a data latch connected to the bit lines in the memory array to hold the read data and write data, and a voltage step-up circuit for generating a high voltage required for write and erase operation. This flash memory 110 may be designed to comprise a so-called flash controller which can control the data write and read operations depending on an instruction (command) from the MPU 121 or may be designed not to comprise the flash controller to give the function of the flash controller to the buffer control unit 125 or MPU 121.

Moreover, the flash memory 110 is also configured to operate in accordance with the commands and control signals. As the commands effectively used for the flash memory, there are provided a write command and a erase command or the like in addition to the read command. In addition, as the control signals inputted to the flash memory 110, there are provided a chip selection signal CE, a write control signal WE for indicating the read or write operation, an output control signal OE for giving an output timing, a system clock SC and a command enable signal CDE for indicating the command input or address input. These commands and control signals are supplied from the MPU 121 or the like.

FIG. 1 illustrates external terminals provided to the conventional card memory which is called the multimedia card. Details of the external terminals provided to the memory card of this embodiment are illustrated in FIG. 2. This external terminal will be described later.

As illustrated in FIG. 1, the external terminals provided to the conventional card memory called the multimedia card (hereinafter referred to as MMC) include seven terminals, namely a terminal 131 indicating that the card is in the selected condition or enable condition, a command terminal 132 to which the command given to the card from the external device is inputted, two ground terminals 133, 136 for receiving the ground potentials Vss1, Vss2, a power supply-terminal 134 for receiving the power source voltage Vcc, a clock terminal 135 for receiving the clock signal CK to give the timing, and a data terminal 137 for inputting the write data given to the card from the external device and outputting the read data read from the card to the host CPU. As described above, when only one data terminal is provided, the data is inputted and outputted serially.

Meanwhile, the memory card of this embodiment is provided, as illustrated in FIG. 2, with six external terminals 138 to 143 for data input and output, in addition to the external terminals 131 to 137 provided to the conventional multimedia card. In addition, the terminal 131 for indicating that the card is in the selected condition or in the enable condition is also used as the input/output terminal. Accordingly, the memory card of this embodiment is provided, for data input and output, with eight external terminals in total of 131, 137 and 138 to 143. Therefore, the memory card of this embodiment is capable of inputting and outputting in parallel the data of 8-bit in maximum.

FIG. 2 illustrates the elements and circuit blocks related to the present invention among the circuits provided in the host interface unit 122.

As illustrated in FIG. 2, the data input/output terminals 131, 137 to 143 of the memory card of this embodiment are connected with the power source voltage Vcc via the pull-up resistors R0 to R7 and is also provided with a level detection circuit 221 for detecting the level of external terminals, a timing generation circuit 222 for giving the detection timing and a data transfer circuit 223 for data transfer through the switching of the data bus width depending on the control signal from the level detection circuit 221. The level detection circuit 221 may be formed of a logic gate circuit such as an inverter having an adequate logic threshold value or of a comparator for comparing the reference voltage with an input voltage.

To the level detection circuit 221, the potentials of four terminals 140 to 143 among the external terminals 131, 137 to 143 connected with the pull-up resistors R0 to R7 are inputted and the level detection circuit 221 detects whether the potentials of the terminals 140 to 143 are in the high level or low level in the timing of the signal supplied from the timing generation circuit 222 and then generates the control signal depending on the detected level to supply this control signal to the data transfer circuit 223.

The timing generation circuit 222 is formed of a one-shot pulse generation circuit. This timing generation circuit 222 generates a control pulse CMD_PULSE when a command is inputted to the terminal 132 from an external device and then supplies this control pulse to the level detection circuit 221. The signals inputted to the other external terminals 131, 137 to 139 are supplied in direct to the data transfer circuit 223. The command CMD inputted to the external terminal 132 is also supplied to the MPU 121.

Here, the commands inputted to the card from an external device include, for example, a read command for instructing the read operation of the data from the card, a write command for instructing the write operation of data to the card and a reset command for instructing to set the internal condition of card to the initial condition. In this embodiment, the timing generation circuit 222 is configured to generate the control pulse CMD_PULSE even when any command is inputted, but it is also possible to configure the timing generation circuit 222 to generate the control pulse CMD_PULSE only when the predetermined command such as the read command or write comment is inputted. The pull-up resistors R0 to R7 may also be provided as the external elements but these are provided within the controller chip 120 in this embodiment. Thereby, packing density of the card can be enhanced.

Upon reception of the one-shot pulse CMD_PULSE, the level detection circuit 221 outputs, to the data transfer circuit 223, the control signal to instruct to process the write data or read data in unit one bit (serial data transfer) or four bits (4-bit parallel data transfer) or 4-bit and 8-bit (4-bit parallel data or 8-bit parallel data transfer) depending on the potential condition of the external terminals 140 to 143. In the case of 4-bit data, the data is inputted and outputted via the external terminals 131, 137 to 139. In the case of 8-bit data, the data is inputted and outputted via the external terminals 131, 137 to 139.

The control signals supplied to the data transfer circuit 223 from the level detection circuit 221 include, although not particularly restricted, the mode selection signal MDSL and enable signals MMC1EN, MMC4EN, MMC8EN for instructing the bus width in this embodiment.

The data transfer circuit 223 is formed of a data latch circuit and a serial/parallel conversion circuit or the like and operates in response to the control signal from the level detection circuit 221. As an alternative circuit of the data latch circuit and serial/parallel conversion circuit, a circuit such as data selector may be provided. To the data transfer circuit 223, the signal W/R indicating the data transfer direction, namely fetch of the write data from the external terminal or output of read data read from the flash memory 110 is supplied depending on the command inputted from the MPU 121.

Here, it is also possible that the data transfer circuit 223 has the function to transfer the 4-bit or 8-bit data inputted depending on the structure of the internal bus to the buffer control unit 125 after conversion to the 16-bit or 32-bit data or to perform the inverse conversion. Namely, the internal bus is never limited only to 8-bit.

Table 1 illustrates an example of the relationship among the conditions of the external terminals 140 to 143, operation mode determined with the level detection circuit 221 and bus width of data set in the data transfer circuit 223.

TABLE 1

| Mode | Bus Width | DAT7 | DAT6 | DAT5 | DAT4 |
|---|---|---|---|---|---|
| MMC | x1 | H | H | H | H |
| High-speed | x1 | L | L | L | L |
| MMC/SMC | x4 | L | H | L | L |
| | x8 | H | L | L | L |

As illustrated in Table 1, when all potentials of the external terminals 140 to 143 are high levels, the level detection circuit 221 outputs the control signal to instruct the fetch of the data signal only from the external terminal 137 to the data transfer circuit 223, upon determination of the conventional MMC mode. More specifically, the mode selection signal MDSLT is set to the high level, while the enable signals MMC1EN, MMC4EN, MMC8EN are all set to the low level.

Moreover, when all potentials of the external terminals 140 to 143 are in the low level, the level detection circuit 221 determines the high speed MMC mode and outputs the control signal to instruct high speed fetch of data signal only from the external terminal 137 to the data transfer circuit 223. More specifically, the mode selection signal MDSLT and enable signal MMC1EN are set to the high level and the enable signals MMC4EN and MMC8EN are set to the low level.

Moreover, when the potential of the terminal 142 (DAT6) among the external terminals 140 to 143 is in the high level, the level detection circuit 221 determines the high speed 4-bit MMC mode and outputs, to the date transfer circuit 223, the control signals to instruct the parallel fetch of the 4-bit data signal from the external terminals 131, 137 to 139. More specifically, the mode selection signal MDSLT and enable signal MMC4EN are set to the high level, while the enable signals MMC1EN and MMC8EN are set to the low level.

Moreover, when the potential of terminal 143 (DAT7) among the external terminals 140 to 143 is in the high level, the level detection circuit 221 determines the high speed 8-bit MMC mode and outputs, to the data transfer circuit 223, the control signal to instruct parallel fetch of the 8-bit data signal from the external terminals 131, 137 to 143. More specifically, the mode selection signal MDSLT and enable signal MMC8EN are set to the high level, while the enable signals MMC1EN and MMC4EN are set to the low level.

The above table 1 illustrates only an example and it is also possible that when the potential of the external terminal 140 (DAT4) or 141 (DAT5) is high level, the level detection circuit 221 determines the high speed 8-bit MMC mode or high speed 4-bit MMC mode. Moreover, when two or three potentials of the external terminals 140 (DAT4) to 143 (DAT7) are high level, the level detection circuit 221 determines the high speed 8-bit MMC mode or high speed 4-bit MMC mode. In summary, the relationship between the combination of potentials of the external terminals 140 (DAT4) to 143 (DAT7) and the mode can be set freely, except for the conventional MMC mode.

Next, operations of the memory card of the first embodiment configured as described above will be described using the timing charts of FIG. 3 to FIG. 6.

When a memory card is inserted into the slot of an external device and commands are inputted to the external terminal 132 of the card from the external device, the control pulse CMD_PULSE is generated (timing t1) as illustrated in FIG. 3. In the case where the card slot of the external device to which the memory card is inserted corresponds to the conventional MMC having only seven external terminals as illustrated in FIG. 1, the external terminals 138 to 143 are left unconnected. Therefore, these are set to the high level (power source voltage Vcc) with the pull-up resistors R1 to R7.

Therefore, the level detection circuit 221 detects that all potentials of the external terminals 140 to 143 are in the high level and determines the connected device as the external device corresponding to the conventional MMC. Accordingly, only the signal MDSLT among the signals MDSLT and MMC1EN to MMC8EN supplied to the data transfer circuit 223 is varied to the high level from the low level (timing t2 of FIG. 3).

When the command inputted from the external device connected is the write command, the data transfer circuit 223 starts to fetch the data (DAT0) inputted serially from the external terminal 137 by receiving such command (timing t3) Moreover, when the command inputted from the external device connected is the read command, the data transfer circuit 223 outputs the data read from the flash memory 110 to the terminal 131 as the serial data. In this case, the data is inputted and outputted based on the clock signal CLK being inputted to the external terminal 135.

Next, the slot of the external device to which a memory card is inserted is provided corresponding to the card having the external terminals 138 to 143 in addition to the seven external terminals provided to the conventional MMC. When a command is inputted under the condition that a low level potential is inputted to all the external terminals 140 to 143 from the external device, the level detection circuit 221 detects that the potential of the external terminals 140 to 143 is low level and determines the external device as that corresponding to the high speed MMC to change the signals MDSLT and MMC1EN to the high level from the low level among the signals MDSLT, MMC1EN to MMC8EN supplied to the data transfer circuit 223 (timing t12 of FIG. 4).

Upon reception of these signals, the data transfer circuit 223 starts to fetch or output the data (DAT0) inputted in serial from the external terminal 137 (timing t13). In this case, as will be understood from the period T1 of FIG. 3 and FIG. 4, the data fetch or output is conducted at a higher rate than the data fetch or output of the MMC data of the conventional type.

Next, since the slot of the external device to which a memory card is inserted corresponds to the card having the external terminals 138 to 143 in addition to the seven external terminals provided to the card of the conventional type, when a low level potential is inputted to the terminals 140, 141, 143 among the external terminals 140 to 143 from the external device, only the potential of the terminal 142 is set to the high level (power source voltage Vcc) with the pull-up resistor R6.

When a command is inputted from the external device under this condition, the level detection circuit 221 detects that the potential of the external terminal 142 is high level and the potentials of the external terminals 140, 141, 143 are low level to determine the external device as that corresponding to the high speed 4-bit MMC. Thereby, the level detection circuit 221 varies the signals MDSLT and MMC4EM to the high level from the low level among the signals MDSLT and MMC1EN to MMC8EN supplied to the data transfer circuit 223 (timing t22 of FIG. 5).

When the command inputted from the external device connected is the write command, the data transfer circuit 223 starts, upon reception of this command, to fetch the 4-bit parallel data from the external terminals 131 and 137 to 139 (timing t23). Moreover, when the command inputted is the read command, the data read from the flash memory 110 is outputted to the terminals 131 and 137 to 139 as the 4-bit parallel data.

Next, the slot of the external device to which a memory card is inserted corresponds to the card having the external terminals 138 to 143 in addition to the seven external terminals provided to the card of the conventional type. Therefore, when a low level potential is inputted to the terminals 140 to 142 among the external terminals 140 to 143 from the external device, the potential of only the terminal 143 is set to the high level (power source voltage Vcc) with the pull-up resistor R7.

When a command is inputted from the external device under this condition, the level detection circuit 221 detects that the potential of the external terminal 143 is high level and the potential of the external terminals 140, 141, and 142 is low level and determines the external device as that corresponding to the high speed 8-bit MMC to change the signals MDSLT and MMC8EN to the high level from the low level among the signals MDSLT, MMC1EN to MMC8EN supplied to the data transfer circuit 223 (timing t32 of FIG. 6).

When the command inputted from the external device connected is the write command, the data transfer circuit 223 starts to fetch the 8-bit parallel data from the external terminals 131, 137 to 143 (timing t33). Moreover, when the input command is the read command, the data read from the flash memory 110 is outputted to the terminals 131, 137 to 143 as the 8-bit parallel data.

Next, the second embodiment of the memory card of the present invention will be described with reference to FIG. 7 and FIG. 8.

The difference between the second embodiment and the first embodiment is that the level detection circuit 221 determines the operation mode from the conditions of the four external terminals 140 to 143 in the first embodiment, while the level detection circuit 221 determines the operation mode from the conditions of eight external terminals 131, 137 to 143 in the second embodiment. Therefore, in the second embodiment, the potential of the external terminals 131, 137 to 139 is also inputted to the level detection circuit 221, in addition to the potential of the external terminals 140 to 143. In addition, the level detection circuit 221 generates, depending on the conditions of these terminals, the eight signals DAT7EN to DAT0EN which indicate validity of input to the terminal and then supplies these signals to the data transfer circuit 223.

Accordingly, the memory card of the second embodiment results in the merits that the data transfer of desired number of bits, such as 2-bit parallel transfer, 3-bit parallel transfer and 6-bit parallel transfer are possible in addition to the serial data transfer, 4-bit parallel transfer and 8-bit parallel transfer and the terminal for data input and output can be determined as desired from the terminals 131, 137 to 143.

FIG. 8 illustrates the timings of operations when the potential of the terminals 131, 137 to 139 of the memory card of the second embodiment configured as described above is set to the low level, while the potential of the terminals 140 to 143 is set to high level. Even in this embodiment, the level detection circuit 221 determines a type of the external device by detecting potential conditions of the external terminals 131, 137 to 143 when the command is inputted.

As illustrated in FIG. 8, when the potential of DAT0 to DAT3 among the potentials DAT0 to DAT7 of the external terminals 131, 137 to 143 is low level and the potential of DAT4 to DAT7 is high level when the command is inputted, the level detection circuit 221 varies only the signals DAT3EN to DAT0EN among the signals DAT7EN to DAT0EN for the data transfer circuit 223 to the valid level (for example, high level) in order to notify, to the data transfer circuit 223, that the data DAT0 to DAT3 of the terminals 132, 137 to 139 are valid, while the data DAT4 to DAT7 of the terminals 140 to 143 are invalid.

Thereby, the data transfer circuit 223 fetches only the data DAT0 to DAT3 and transfers the data to the buffer control unit 123 when the input command is the write command. In addition, when the input command is the read command, the data read from the flash memory 110 is outputted to the terminals 131, 137 to 139 as the 4-bit parallel data.

The present invention has been described practically based on the preferred embodiments thereof but the present invention is never limited only to these embodiments and naturally allows various changes and modifications within the scope not departing from the claims thereof. For example, in the embodiments, the present invention has been applied to a multimedia card (MMC), but the present may also be applied to a memory card called an SMC (Secure Mobile Card) which has the similar specifications and improved security to prevent illegal copying of the work such as music contents and a memory card of the other specifications. In addition, the structure of controller chip 120 is not limited only to that of FIG. 1 and the chip controller 120 is also allowed even when it does not include, for example, the buffer memory 124 and the buffer control unit 125.

In above description, the present invention has been mainly applied to a memory card comprising a flash memory which is the major application field as the background but the present invention is never limited thereto. Namely, the present invention can also be utilized for a memory card comprising an EEPROM chip or other nonvolatile memory chips or to a memory module in which a plurality of nonvolatile memories and the control LSI may be mounted on a printed wiring substrate.

Briefly, the present invention can provide the following effects.

Namely, according to the present invention, high speed data transfer may be realized while compatibility of a card type storage device comprising a nonvolatile memory is ensured.

What is claimed is:

1. A nonvolatile storage device comprising:

a plurality of external terminals;

a controller; and a nonvolatile memory, said controller controlling storage operation of data inputted from said external terminals to an area within said nonvolatile memory, said storage operation being dependent on control information inputted from any of said plurality of external terminals, wherein the nonvolatile storage device includes:

a plurality of external data terminals to which a data signal is inputted;

a pull-up circuit to pull up the external data terminals to a power source voltage;

a level detection circuit to detect a potential of at least one of said external data terminals; and a data transfer circuit to selectively fetch the data signal inputted to said plurality of external data terminals and then transfer the data signal to an internal circuit as data of a bus width, and wherein said level detection circuit detects a potential of at least one of said plurality of external data terminals when said control information is inputted, and said data transfer circuit determines said bus width depending on a combination of potentials of a group of the external data terminals.

2. The nonvolatile storage device according to claim 1, wherein eight terminals are provided in total as said plurality of external data terminals and the potentials of four external data terminals are detected by said level detection circuit.

3. The nonvolatile storage device according to claim 2, wherein when said level detection circuit detects that the potentials of said four external data terminals are all higher than the predetermined potential, said data transfer circuit fetches the data signal inputted to one of said plurality of external data terminals and then transfers the data signal to the internal circuit.

4. The nonvolatile storage device according to claim 3, wherein when said level detection circuit detects that a potential of a first terminal of said four external data terminals is lower than the predetermined potential, said data transfer circuit fetches the data signal inputted to one of said plurality of external data terminals at a higher rate than a rate when the potentials of said four external data terminals are all higher than the predetermined potential and then transfers the data signal to the internal circuit.

5. The nonvolatile storage device according to claim 4, wherein when said level detection circuit detects that a potential of a second terminal of said four external data terminals is higher than the predetermined potential, said data transfer circuit fetches the data signal inputted to the external data terminals other than said four external data terminals and then transfers the data signal to the internal circuit.

6. The nonvolatile storage device according to claim 5, wherein when said level detection circuit detects that a potential of a third terminal of said four external terminals is higher than the predetermined potential, said data transfer circuit fetches the data signal inputted to all of said eight external data terminals and then transfers the data signal to the internal circuit.

7. The nonvolatile storage device according to claim 6, wherein any one of said eight external data terminals is also used as a terminal to which a control signal is inputted.

8. The nonvolatile storage device according to claim 7, wherein said pull-up circuit is formed on a same semiconductor chip as said controller.

9. The nonvolatile storage device according to claim 8, further comprising a volatile memory to store data, fetched from said external data terminals and transferred by said data transfer circuit, before the data is written to said nonvolatile memory.

10. The nonvolatile storage device according to claim 9, further comprising a timing generation circuit to generate a detection timing signal for said level detection circuit by detecting an input of said control signal.

* * * * *